(12) United States Patent
Chang

(10) Patent No.: US 10,048,525 B2
(45) Date of Patent: Aug. 14, 2018

(54) LIQUID CRYSTAL DEVICE

(71) Applicant: Wistron Corporation, New Taipei (TW)

(72) Inventor: Yao-Lin Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/389,400

(22) Filed: Dec. 22, 2016

(65) Prior Publication Data

US 2018/0101048 A1    Apr. 12, 2018

(30) Foreign Application Priority Data

Oct. 7, 2016  (TW) .............................. 105132469 A

(51) Int. Cl.
*G02F 1/1333* (2006.01)
*G02F 1/133* (2006.01)
*G02F 1/1345* (2006.01)

(52) U.S. Cl.
CPC .... *G02F 1/133308* (2013.01); *G02F 1/13306* (2013.01); *G02F 1/13452* (2013.01); *G02F 1/133382* (2013.01); *G02F 2001/133325* (2013.01); *G02F 2001/133331* (2013.01); *G02F 2201/50* (2013.01)

(58) Field of Classification Search
None
See application file for complete search history.

(56) References Cited

U.S. PATENT DOCUMENTS

| | | | |
|---|---|---|---|
| 2004/0036834 A1 | 2/2004 | Ohnishi | |
| 2005/0073640 A1* | 4/2005 | Dunn | G02F 1/133308 349/161 |
| 2005/0105009 A1 | 5/2005 | Dunn | |
| 2008/0115883 A1* | 5/2008 | Mishima | G02F 1/1303 156/273.3 |
| 2009/0237774 A1* | 9/2009 | Ito | G02F 1/167 359/296 |
| 2015/0370119 A1* | 12/2015 | Liu | G02F 1/133382 349/106 |

OTHER PUBLICATIONS

Office action dated Dec. 20, 2016 for TW application No. 105132469, filed: Oct. 7, 2016, p. 2 Line 19-26, p. 3 and p. 4 Line 1-6.

* cited by examiner

*Primary Examiner* — James Dudek
(74) *Attorney, Agent, or Firm* — Winston Hsu

(57) ABSTRACT

A liquid crystal device includes a vacuum insulating structure, a liquid crystal panel and a control circuit board. The vacuum insulating structure includes a first glass sheet, a second glass sheet, and a sealant. The sealant is attached between the first glass sheet and the second glass sheet for forming a vacuum space cooperatively with the first glass sheet and the second glass sheet by a vacuum pumping process. The liquid crystal panel is disposed in the vacuum space. The control circuit board is electrically connected to the liquid crystal panel for controlling the liquid crystal panel.

11 Claims, 3 Drawing Sheets

LIQUID CRYSTAL DEVICE

BACKGROUND OF THE INVENTION

1. Field of the Invention

The present invention relates to a liquid crystal device, and more specifically, to a liquid crystal device having a vacuum insulating structure.

2. Description of the Prior Art

In general, an industrial computer or all-in-one computer operated in a special environment usually utilizes a TFT (Thin Film Transistor) liquid crystal screen for displaying images. However, since liquid crystal molecules are solidified in an environment with a low temperature less than −20° C., it may make the solidified liquid crystal molecules incapable of twisting under the voltage difference applied by the thin film transistor, so as to cause abnormal display of the TFT liquid crystal screen. On the other hand, if the TFT liquid crystal screen is operated in an environment with a high temperature higher than 70° C., each liquid crystal molecule would lose its high directivity due to melt of each liquid crystal molecule, so as to cause abnormal display of the TFT liquid crystal screen. In summary, the aforesaid problems greatly limit the practical application of the TFT liquid crystal screen.

SUMMARY OF THE INVENTION

The present invention provides a liquid crystal device including a vacuum insulating structure, a liquid crystal panel and a control circuit board. The vacuum insulating structure includes a first glass sheet, a second glass sheet, and a sealant. The sealant is attached between the first glass sheet and the second glass sheet for forming a vacuum space cooperatively with the first glass sheet and the second glass sheet by a vacuum pumping process. The liquid crystal panel is disposed in the vacuum space. The control circuit board is electrically connected to the liquid crystal panel for controlling the liquid crystal panel.

The present invention further provides a liquid crystal device including a first glass sheet, a second glass sheet, a sealant, a liquid crystal panel, a heating module, and a control circuit board. The sealant is attached between the first glass sheet and the second glass sheet for forming a containing space cooperatively with the first glass sheet and the second glass sheet. The liquid crystal panel is disposed in the containing space. The liquid crystal panel has a plurality of driving integrated circuits and a plurality of pixels. The plurality of driving integrated circuits is coupled to the plurality of pixels respectively for controlling each pixel. The heating module includes a plurality of heating pads and a plurality of transparent traces. The plurality of heating pads is attached to a surface of at least one of the first glass sheet and the second glass sheet facing the liquid crystal panel corresponding to the plurality of pixels respectively. The plurality of transparent traces is formed on the surface of the at least one of the first glass sheet and the second glass sheet and is coupled to the plurality of heating pads and the plurality of driving integrated circuits. The control circuit board is coupled to the plurality of transparent traces for controlling the plurality of heating pads and the plurality of driving integrated circuits.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
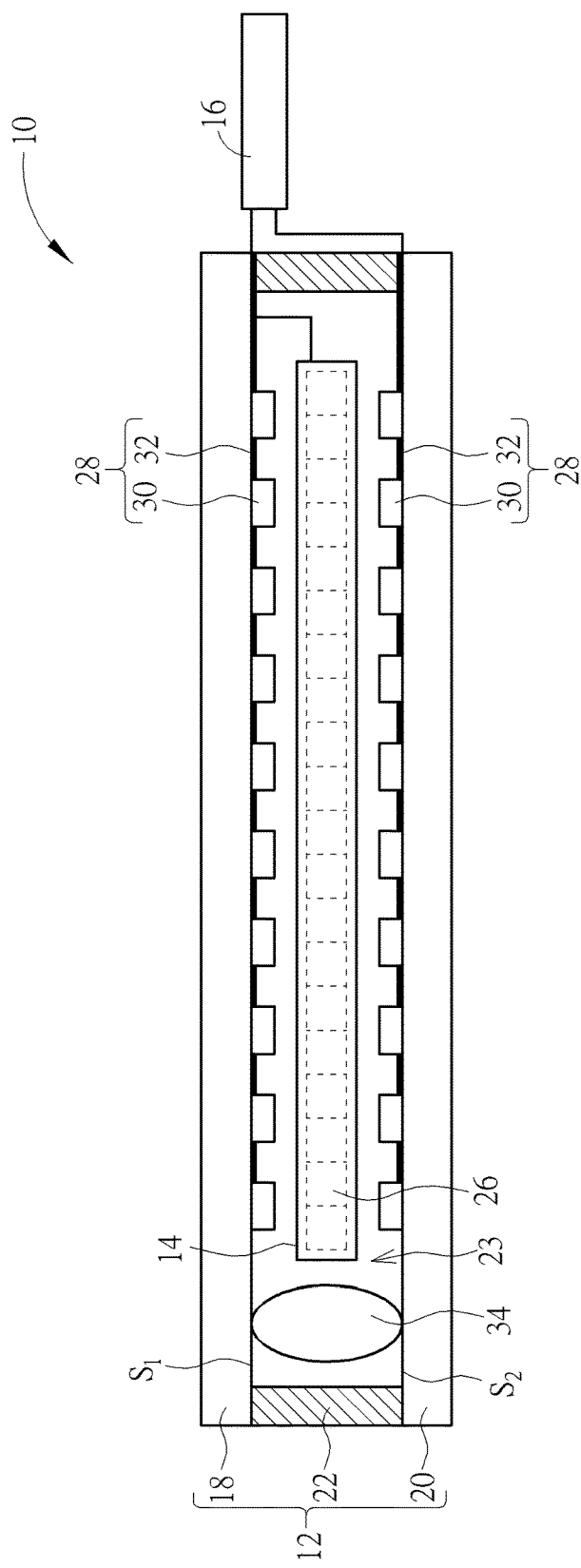
FIG. 1 is an internal diagram of a liquid crystal device according to an embodiment of the present invention.
Figure 2:
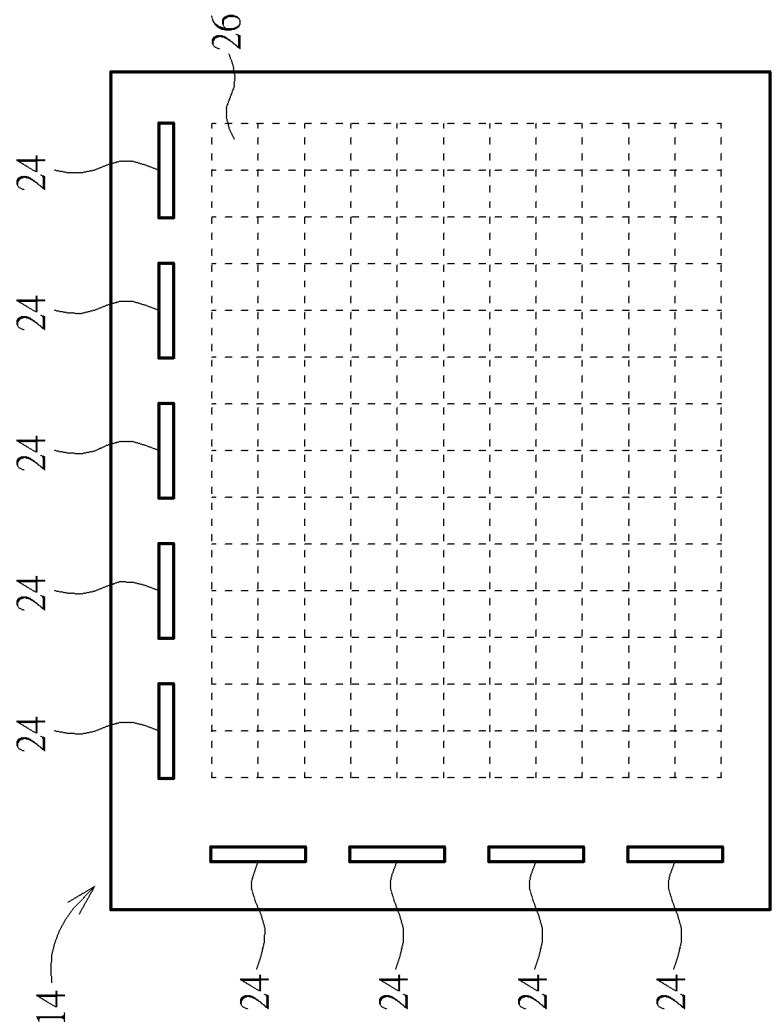
FIG. 2 is a top view of a liquid crystal panel in FIG. 1.

Please refer to FIG. 1 and FIG. 2. FIG. 1 is an internal diagram of a liquid crystal device 10 according to an embodiment of the present invention. FIG. 2 is a top view of a liquid crystal panel 14 in FIG. 1. As shown in FIG. 1 and FIG. 2, the liquid crystal device 10 could be preferably a TFT liquid crystal screen and includes a vacuum insulating structure 12, a liquid crystal panel 14, and a control circuit board 16. The vacuum insulating structure 12 includes a first glass sheet 18, a second glass sheet 20, and a sealant 22. The sealant could be preferably made of ultraviolet curing adhesive or thermoplastic material (but not limited thereto, meaning that it could vary with the practical manufacturing needs of the liquid crystal device 10), and could be attached to the first glass sheet 18 and the second sheet 20 for forming a vacuum space 23 cooperatively with the first glass sheet 18 and the second glass sheet 20 by a vacuum pumping process so that the liquid crystal panel 14 could be contained in the vacuum space 23. To be noted, the present invention could adopt a vacuum pumping method commonly applied to a liquid crystal panel, and the related description is omitted herein since it is commonly seen in the prior art.

Furthermore, as shown in FIG. 1 and FIG. 2, the liquid crystal panel 14 could have a plurality of driving integrated circuits 24 and a plurality of pixels 26 (briefly depicted by dotted lines in FIG. 1 and FIG. 2). The plurality of driving integrated circuits 24 could be gate integrated circuits and source integrated circuits commonly applied to a TFT liquid crystal panel, and could be coupled to the plurality of pixels 26 for pixel control of the liquid crystal device 10. As for the related description for the display control design of the pixels 26 by the driving integrated circuits 24 (e.g. line by line scanning), it is commonly seen in the prior art and omitted herein.

In this embodiment, the liquid crystal device 10 could further include a heating module 28 for heating the liquid crystal panel 14. The heating module 28 could include a plurality of heating pads 30 and a plurality of transparent traces 32. The plurality of heating pads 30 is attached to a surface $S_1$ of the first glass sheet 18 facing the liquid crystal panel 14 and a surface $S_2$ of the second glass sheet 20 facing the liquid crystal panel 14 respectively (but not limited thereto) corresponding to the plurality of pixels 26 for heating liquid crystal molecules in each pixel 26. For example, the heating pad 30 could be formed as a semiconductor transparent film by a film electro-deposition process, and could generate the film heating effect when the heating pad 30 is electrified. The related description for the heating principle of the heating pad 30 is omitted herein since it is commonly seen in the prior art. The plurality of transparent traces 32 could be preferably made of ITO (Indium Tin Oxide) material and could be formed on the surface $S_1$ of the first glass sheet 18 and the surface $S_2$ of the second glass sheet 20 by a coating or attachment process. Accordingly, the control circuit board 16 could be coupled to the plurality of heating pads 30 and the plurality of driving integrated circuits 24 via the plurality of transparent traces 32 for turning on or off the heating pads 30 and controlling the driving integrated circuits 24. Electrical connection between the control circuit board 16 and the transparent traces 32 and electrical connection between the transparent traces 32 and the driving integrated circuits 24 could be preferably established by a flexible printed circuit. In practical application, the control circuit board 16 could be preferably disposed outside the vacuum insulating structure 12 (as shown in FIG. 1), so as to prevent the vacuum space 23 from being occupied by disposal of the control circuit board 16. Furthermore, via the design that the plurality of driving integrated circuits 24 on the liquid crystal panel 14 could be directly coupled to the control circuit board 16 via the transparent traces 32 formed on the first glass sheet 18 and the second glass sheet 20, the present invention could simplify the circuit design of the liquid crystal device 10.

In such a manner, if the liquid crystal device 10 is operated in an environment with a high temperature (e.g. higher than 70° C.), the present invention could generate the vacuum insulating effect by disposing the liquid crystal panel 14 in the vacuum space 23 to insulate external heat energy from being transmitted to the liquid crystal molecules in each pixel 26 of the liquid crystal panel 14 for preventing melt of the liquid crystal molecules. On the other hand, if the liquid crystal device 10 is operated in an environment with a low temperature (e.g. lower than −20° C.), the present invention could control the control circuit board 16 to turn on the heating pads 30 for heating the liquid crystal molecules in each pixel 26, so as to prevent solidification of the liquid crystal molecules. Thus, the present invention could efficiently solve the prior art problem that abnormal display of the TFT liquid crystal screen occurs due to melt of the liquid crystal molecules at a high temperature or solidification of the liquid crystal molecules at a low temperature, so as to greatly improve flexibility of the TFT liquid crystal screen in practical application and enhance steadiness of the TFT liquid crystal screen in display of image.

It should be mentioned that a temperature sensing mechanism could be further applied to the present invention if the liquid crystal device 10 is operated in an environment with high temperature variation. For example, in another embodiment, the control circuit board could turn on the heating pads to heat the liquid crystal molecules in each pixel of the liquid crystal panel only when determining the liquid crystal device is operated in an environment with a temperature lower than a specific value (e.g. −20° C.), such as additionally disposing a temperature sensor on the control circuit board so that the control circuit board could determine whether to turn on the heating pads according to the detecting result of the temperature sensor, for generating the power saving effect. Furthermore, in practical application, the vacuum insulating structure 12 could further include at least one spacer 34 (one shown in FIG. 1, but not limited thereto). The spacer 34 is disposed between the first glass sheet 18 and the second glass sheet 20 and located in the vacuum space 23, so as to ensure that the first glass sheet 18 and the second glass sheet 20 could be spaced at a distance in parallel for forming the vacuum space 23 cooperatively with the sealant 22. The spacer 34 could be made of material (e.g. resin) commonly applied to separating glass sheets of a conventional liquid crystal panel, but not limited thereto.

Figure 3:
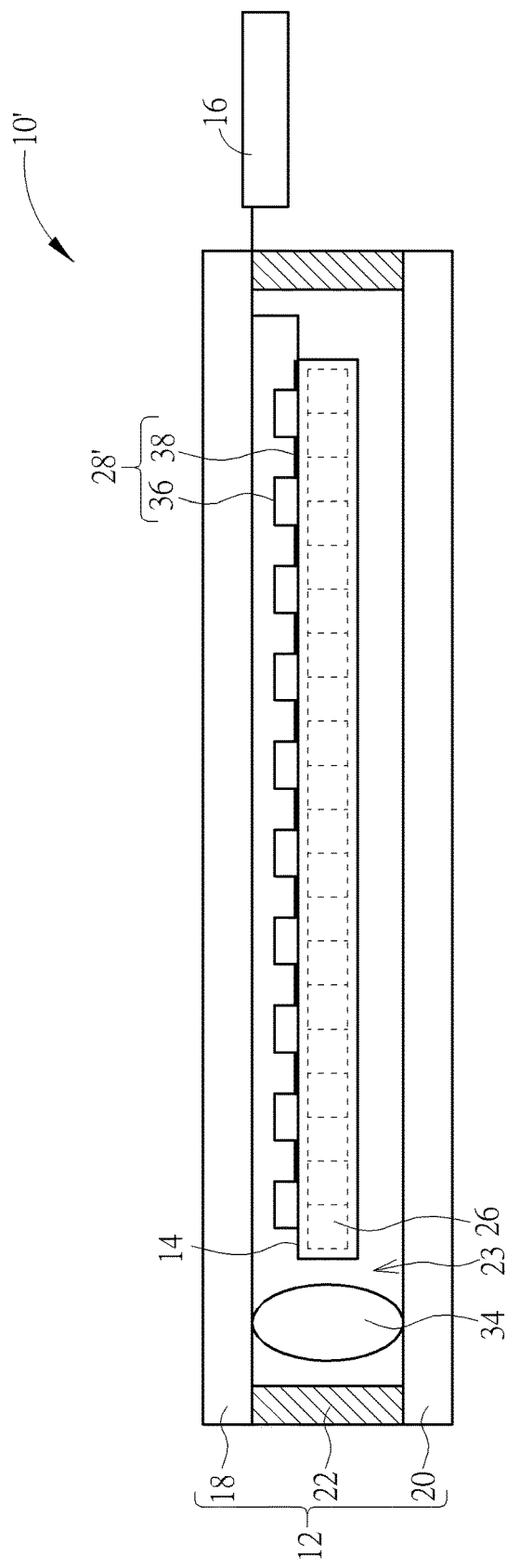
FIG. 3 is an internal diagram of a liquid crystal device according to another embodiment of the present invention.

Moreover, disposal of the heating module is not limited to the aforesaid embodiment. For example, please refer to FIG. 3, which is an internal diagram of a liquid crystal device 10' according to another embodiment of the present invention. Components both mentioned in this embodiment and the aforesaid embodiment represent components with similar structures or functions. In this embodiment, as shown in FIG. 3, the liquid crystal device 10' includes the vacuum insulating structure 12, the liquid crystal panel 14, the control circuit board 16, and a heating module 28'. The heating module 28' could include a plurality of heating pads 36 and a plurality of transparent traces 38. The plurality of heating pads 36 is attached to the liquid crystal panel 14 respectively corresponding to the plurality of pixels 26 (briefly depicted by dotted lines in FIG. 3) for heating the liquid crystal molecules in each pixel 26. The plurality of transparent traces 38 could be preferably made of ITO material and could be formed on the liquid crystal panel 14 by a coating or attachment process. Accordingly, the control circuit board 16 could be coupled to the plurality of heating pads 30 and the plurality of driving integrated circuits 24 (not shown in FIG. 3, the related description could be reasoned by analogy according to the aforesaid embodiment) via the plurality of transparent traces 32 for turning on or off the heating pads 30 and controlling the driving integrated circuits 24. Electrical connection between the control circuit board 16 and the transparent traces 32 could be preferably established by a flexible printed circuit. As for other related description for the liquid crystal device 10' (e.g. the vacuum insulating design that the liquid crystal panel 14 is disposed in the vacuum space 23), it could be reasoned by analogy according to the aforesaid embodiment and omitted herein.

To be noted, the aforesaid vacuum insulating design and the aforesaid heating design are selectively omitted for simplifying the structural design of the liquid crystal device of the present invention. For example, in another embodiment that the aforesaid vacuum insulating design is omitted, the liquid crystal device provided by the present invention could only include the first glass sheet, the second glass sheet, the sealant, the liquid crystal panel, the heating module and the control circuit board, and the liquid crystal panel could be disposed in a containing space formed cooperatively by the first glass sheet, the second glass sheet, and the sealant. Accordingly, the present invention could utilize the heat pads attached to the first glass sheet and the second glass sheet to heat the liquid crystal molecules in each pixel of the liquid crystal panel when the liquid crystal device is operated in an environment at a low temperature.

On the other hand, in another embodiment that the heating design is omitted, the liquid crystal device provided by the present invention could only include the vacuum insulating structure, the liquid crystal panel and the control circuit board, and the liquid crystal panel is contained in a vacuum space cooperatively formed by the first glass sheet, the second glass sheet and the sealant via a vacuum pumping process. In such a manner, the present invention could insulate external heat energy from being transmitted to the liquid crystal molecules in each pixel of the liquid crystal panel for generating the heat insulating effect. As for the other related description for these derived embodiments, it could be reasoned by analogy according to the aforesaid embodiments and omitted herein.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal device comprising:
   a vacuum insulating structure comprising:
      a first glass sheet;
      a second glass sheet; and
      a sealant attached between the first glass sheet and the second glass sheet for forming a vacuum space cooperatively with the first glass sheet and the second glass sheet by a vacuum pumping process;
   a liquid crystal panel disposed in the vacuum space, the liquid crystal panel having a pair of liquid crystal display (LCD) panel substrates, a plurality of driving integrated circuits and a plurality of pixels disposed on the pair of LCD panel substrates, the plurality of driving integrated circuits being disposed on the pair of LCD panel substrates and coupled to the plurality of pixels respectively for controlling each pixel; and
   a control circuit board electrically connected to the liquid crystal panel for controlling the liquid crystal panel.

2. The liquid crystal device of claim 1, wherein the liquid crystal device further comprises:
   a heating module comprising:
      a plurality of heating pads attached to a surface of at least one of the first glass sheet and the second glass sheet facing the liquid crystal panel corresponding to the plurality of pixels respectively; and
      a plurality of transparent traces formed on the surface of the at least one of the first glass sheet and the second glass sheet, the control circuit board being coupled to the plurality of heating pads and the plurality of driving integrated circuits via the plurality of transparent traces for controlling the plurality of heating pads and the plurality of driving integrated circuits.

3. The liquid crystal device of claim 2, wherein the control circuit board is disposed outside the vacuum insulating structure.

4. The liquid crystal device of claim 1, wherein the liquid crystal device further comprises:
   a heating module comprising:
      a plurality of heating pads attached to the liquid crystal panel corresponding to the plurality of pixels respectively; and
      a plurality of transparent traces formed on the liquid crystal panel, the control circuit board being coupled to the plurality of heating pads and the plurality of driving integrated circuits via the plurality of transparent traces for controlling the plurality of heating pads and the plurality of driving integrated circuits.

5. The liquid crystal device of claim 4, wherein the control circuit board is disposed outside the vacuum insulating structure.

6. The liquid crystal device of claim 1, wherein the control circuit board turns on the plurality of heating pads for heating the plurality of pixels when the control circuit board determines that an environmental temperature is less than a specific value.

7. The liquid crystal device of claim 1, wherein the vacuum insulating structure further comprises:
   a spacer disposed between the first glass sheet and the second glass sheet and located in the vacuum space.

8. A liquid crystal device comprising:
   a first glass sheet;
   a second glass sheet;
   a sealant attached between the first glass sheet and the second glass sheet for forming a containing space cooperatively with the first glass sheet and the second glass sheet;
   a liquid crystal panel disposed in the containing space, the liquid crystal panel having a pair of liquid crystal display (LCD) panel substrates, a plurality of driving integrated circuits and a plurality of pixels disposed on the pair of LCD panel substrates, the plurality of driving integrated circuits being disposed on the pair of LCD panel substrates and coupled to the plurality of pixels respectively for controlling each pixel;
   a heating module comprising:
      a plurality of heating pads attached to a surface of at least one of the first glass sheet and the second glass sheet facing the liquid crystal panel corresponding to the plurality of pixels respectively; and
      a plurality of transparent traces formed on the surface of the at least one of the first glass sheet and the second glass sheet and coupled to the plurality of heating pads and the plurality of driving integrated circuits; and
   a control circuit board coupled to the plurality of transparent traces for controlling the plurality of heating pads and the plurality of driving integrated circuits.

9. The liquid crystal device of claim 8, wherein the control circuit board is disposed outside the containing space.

10. The liquid crystal device of claim 8, wherein the control circuit board turns on the plurality of heating pads for heating the plurality of pixels when the control circuit board determines that an environmental temperature is less than a specific value.

11. The liquid crystal device of claim 8 further comprising:
   a spacer disposed between the first glass sheet and the second glass sheet and located in the containing space.

* * * * *